US008041952B2

(12) United States Patent
Parry

(10) Patent No.: US 8,041,952 B2
(45) Date of Patent: Oct. 18, 2011

(54) SYSTEMS AND METHODS FOR PRINTING DOCUMENTS CONTAINING ELECTRONIC SIGNATURES

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2171 days.

(21) Appl. No.: 09/967,511

(22) Filed: Sep. 28, 2001

(65) Prior Publication Data

US 2003/0063744 A1 Apr. 3, 2003

(51) Int. Cl.
*H04L 9/32* (2006.01)
*G06F 7/04* (2006.01)
*G09C 3/08* (2006.01)

(52) U.S. Cl. ............. 713/176; 726/28; 726/30; 380/51

(58) Field of Classification Search ............... 380/51, 380/201–202; 713/176; 358/1.14; 726/28, 726/30
See application file for complete search history.

(56) References Cited

U.S. PATENT DOCUMENTS

| | | | | | |
|---|---|---|---|---|---|
| 5,606,609 | A * | 2/1997 | Houser et al. | ............ | 713/179 |
| 5,633,932 | A * | 5/1997 | Davis et al. | ............ | 713/176 |
| 5,933,503 | A * | 8/1999 | Schell et al. | ............ | 713/189 |
| 6,185,683 | B1 * | 2/2001 | Ginter et al. | ............ | 713/176 |
| 6,618,566 | B2 * | 9/2003 | Kujirai et al. | ............ | 399/79 |
| 6,789,194 | B1 * | 9/2004 | Lapstun et al. | ............ | 713/176 |
| 6,864,991 | B1 * | 3/2005 | Takahashi | ............ | 358/1.15 |
| 6,876,460 | B2 * | 4/2005 | Torigoe | ............ | 358/1.14 |
| 6,904,524 | B1 * | 6/2005 | Jaeger et al. | ............ | 713/176 |
| 6,904,525 | B1 * | 6/2005 | Berson et al. | ............ | 713/179 |
| 6,907,529 | B1 * | 6/2005 | Hirose | ............ | 726/5 |
| 6,954,854 | B1 * | 10/2005 | Miura et al. | ............ | 713/168 |
| 6,959,382 | B1 * | 10/2005 | Kinnis et al. | ............ | 713/170 |
| 6,970,259 | B1 * | 11/2005 | Lunt et al. | ............ | 358/1.14 |
| 7,010,809 | B2 * | 3/2006 | Hori et al. | ............ | 726/26 |
| 7,028,184 | B2 * | 4/2006 | Hind et al. | ............ | 713/170 |
| 7,178,030 | B2 * | 2/2007 | Scheidt et al. | ............ | 713/176 |
| 7,216,232 | B1 * | 5/2007 | Cox et al. | ............ | 713/176 |
| 7,237,114 | B1 * | 6/2007 | Rosenberg | ............ | 713/176 |
| 2001/0053295 | A1 * | 12/2001 | Kujirai et al. | ............ | 399/79 |
| 2002/0042884 | A1 * | 4/2002 | Wu et al. | ............ | 713/201 |
| 2002/0080959 | A1 * | 6/2002 | Weller | ............ | 380/55 |
| 2002/0171859 | A1 * | 11/2002 | Chen et al. | ............ | 358/1.14 |
| 2003/0014640 | A1 * | 1/2003 | Loyd | ............ | 713/182 |
| 2003/0023850 | A1 * | 1/2003 | Brown et al. | ............ | 713/176 |
| 2005/0102520 | A1 * | 5/2005 | Baxter et al. | ............ | 713/176 |

FOREIGN PATENT DOCUMENTS

WO WO96/25812 8/1996

OTHER PUBLICATIONS

IEEE 100 : the authoritative dictionary of IEEE standards terms. 2000, Institute of Electrical and Electronics Engineering, pp. 268.*

* cited by examiner

*Primary Examiner* — Matthew Henning

(57) ABSTRACT

Systems and methods for validating electronic signatures contained in a printable document prior to allowing the document to be printed. The systems and methods may be incorporated into a printing device or a computer. Documents without electronic signatures are printed normally. If the document contains one or more electronic signatures, then the electronic signature(s) must be validated before the document is allowed to print. Validation is accomplished by comparing a public key contained in the electronic signature to a public key stored in an electronic signature database. If the electronic signature is validated, then the document may print.

7 Claims, 3 Drawing Sheets

SYSTEMS AND METHODS FOR PRINTING DOCUMENTS CONTAINING ELECTRONIC SIGNATURES

TECHNICAL FIELD

This invention generally relates to printing documents containing one or more electronic signatures. More particularly, the invention described herein relates to verifying electronic signatures and printing documents to which the electronic signatures are affixed.

BACKGROUND

As enterprises move from paper-based systems to more economical paperless environments, new barriers are presented that must be overcome with new technology. Business transactions, agreements and authorizations are some examples of events that require one or more person's assent, evidenced by that person's signature, that must be electronically perpetuated in a paperless system. Perpetuation is required to maintain the commercial quality of permanence that is required to support audit, evidentiary and enforcement requirements.

In October 2000, the federal Electronic Signatures in Global and National Commerce Act (also known as "E-Sign") was enacted. The new law broadly authorizes electronic records and electronic signatures as being legally effective. The existence of this new law makes business transactions conducted electronically easier to enforce. Therefore, a major barrier for conducting electronic business transactions has been removed, and greater proliferation of electronic business transactions will no doubt be seen in the marketplace.

While solutions have been found as to how to use and store electronic signatures, problems still exist because many business transactions, although conducted electronically, still require instances wherein the electronic signature and the document with which it is incorporated must be printed. As with other aspects of electronic transactions, methods must be created by which documents can be printed indicating a valid signature affixed to the document. These methods must insure that an electronic signature printed with a document is authentic and that the document on which it appears conforms exactly to the document that was signed by the signer(s) of the document.

SUMMARY

Systems and methods are described herein for printing electronic signatures and documents that contain electronic signatures. The electronic signatures are verified for accuracy before the electronic signature is allowed to be printed.

In one implementation, a printing device is configured to receive documents for printing. The documents may contain one or more electronic signatures that have been affixed to the document by one or more signers of the document. When a user desires to print a document having an electronic signature, the printing device first verifies the authenticity of the signature before allowing the document to be printed.

Each electronic signature contains a user identifier and a public key associated with the user identifier. The user identifier is uniquely associated with a person who signed the document with the electronic signature. The public key is a key derived by encrypting a private key with a password, the private key and the password being unique to the person signing the document.

To verify the authenticity of the device, the printing device parses the electronic signature to determine the user identifier and public key associated with the user identifier. The printing device then accesses a signature authority database that contains a plurality of user identifiers and a plurality of public keys, each public key being associated with a user identifier. If the user identifier and the public key that are contained in the document are associated with each other in the signature authority database, then the printing device determines that the electronic signature is valid and it prints the document. If the electronic signature cannot be validated in this way, then the document will not be printed.

The printed signature may follow a particular format for indicating the signer of the document. For example, in one implementation, an actual image of the signer's signature may be printed. The signature image may be obtained from the signature authority database when the electronic signature is verified. Other formats may also be utilized.

In another implementation, the verification and print job approval/denial may be handled by a host computer connected to a printing device, instead of by the printing device itself.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The following description sets forth one or more specific implementations and/or embodiments of systems and methods for printing electronic signatures and documents containing one or more electronic signatures. The systems and methods incorporate elements recited in the appended claims. These implementations are described with specificity in order to meet statutory written description, enablement, and best-mode requirements. However, the description itself is not intended to limit the scope of this patent.

Also described herein are one or more exemplary implementations of systems and methods for verifying electronic signatures in documents before printing the documents. Applicant intends these exemplary implementations to be examples only. Applicant does not intend these exemplary implementations to limit the scope of the claimed present invention(s). Rather, Applicant has contemplated that the claimed present invention(s) might also be embodied and implemented in other ways, in conjunction with other present or future technologies.

Computer-Executable Instructions

An implementation of a system and/or method for printing documents containing one or more electronic signatures may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer-Readable Media

An implementation of a system and/or method for printing documents containing one or more electronic signatures may be stored on or transmitted across some form of computer-readable media. Computer-readable media can be any available media that can be accessed by a computer. By way of example, and not limitation, computer readable media may comprise "computer storage media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communications media" typically embodies computer-readable instructions, data structures, program modules, or other data in a modulated data signal, such as carrier wave or other transport mechanism. Communication media also includes any information delivery media.

Exemplary Printing Device

Figure 1:
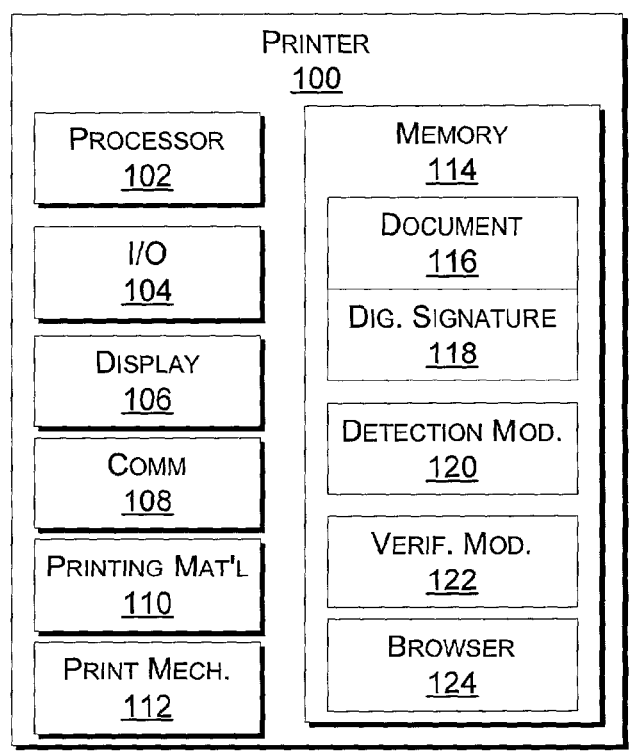
FIG. 1 is a block diagram of a printer configured to print electronic signatures.

FIG. 1 is a block diagram of a printer 100 that is configured to print documents having one or more electronic signatures if and after the electronic signatures have been validated. Although a printer 100 is shown as the exemplary printing device, it is noted that the printing device may also comprises any hard copy device, such as a printer, copier, facsimile machine, and the like.

The printer 100 includes a processor 102, an input/output (I/O) port 104 for connection to a host computing device and a display 106. The printer 100 also includes a communications module 108 that handles network communications, printing material 110 (such as ink, toner, etc.), and a print mechanism 112 for applying printing material 110 to a print medium (not shown) such as paper, transparencies, etc.

The printer 100 also includes memory 114 that is shown having an electronic document 116 stored therein. The document 116 includes a digital signature 118, but the document 116 may contain more than one digital signature. The memory also stores a detection module 120 that is configured to detect the digital signature 118 included in the document 116. A verification module 122 is stored in the memory, the verification module 122 being configured to verify whether or not the digital signature 118 is a valid digital signature for a signer of the document 114. The memory 114 is shown storing a browser 124 that may be used by the printer 100 to navigate the Internet (not shown) or some other network (not shown).

Further details about the configuration and operation of the printer 100 shown in FIG. 1 will be discussed in greater detail, below, with respect to discussion of an environment within which the printer 100 operates.

Exemplary System with Printer for Printing Electronic Signatures

Figure 2:
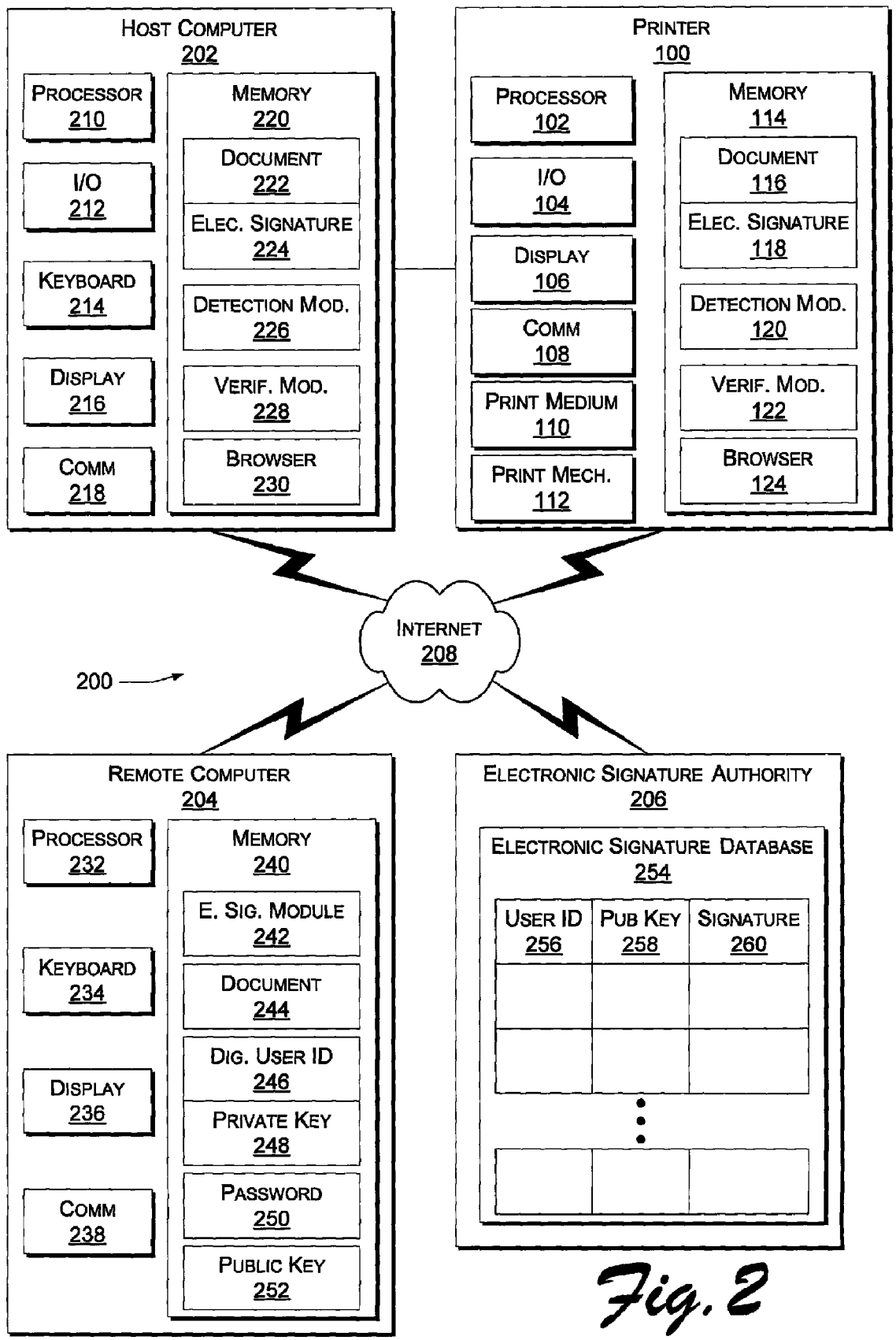
FIG. 2 is a block diagram of a system including a printer for printing documents including one or more electronic signatures.

FIG. 2 is a block diagram of a system 200 that includes the printer 100 shown in FIG. 1. In addition to the printer 100, the system 200 includes a host computer 202 connected to the printer 100, a remote computer 204 from which a digitally signed document may originate, and an electronic signature authority 206 that governs use of electronic/digital signatures. The printer 100, the host computer 202, the remote computer 204 and the electronic signature authority 206 are all configured to connect to and communicate with the Internet 208 or any other network (not shown).

The host computer 202 is a typical desktop computer and includes a processor 210, an input/output (I/O) module 212 through which to communicate with the printer 100, a keyboard 214, a display 216 and a communications module 218 for network connections. The host computer 202 also includes memory 220.

The memory 220 stores an electronic document 222 that includes one or more electronic signatures 224. The memory 220 also stores a detection module 226 configured to detect the presence of the electronic signature 224 included with the document 222. A verification module 228 is also stored in the memory 220 and is configured to verify the authenticity of the electronic signature 224 included in the document 222. The memory 220 also stores a browser 230 that is used to communicate with a network, such as the Internet 208.

It is noted that the memory of the host computer 202 and the memory 114 of the printer 100 contain the same items. Those skilled in the art will readily understand that the functionality described herein as taking place in the printer 100 may also occur in the host computer 202 (except for the actual printing). Although the following discussion will focus on the memory modules in the printer 100 performing certain steps, many of those steps may be performed in the host computer 202, even though the description might not explicitly indicate so.

The remote computer 204 is a typical desktop computer and includes a processor 232, a keyboard 234, a display 236 and a communications module 238. The remote computer 204 also includes memory 240 that stores electronic data. As shown in FIG. 2, the memory 240 includes an electronic signature module 242 that is configured to electronically sign a document 244 using a digital user identifier 246, a private key 248 (that is shown as being a part of the digital user identifier 246), and a password 250 that is know only to a user of the remote computer 204.

In one implementation, a user of the remote computer 204 encrypts the private key 248 with the password 250 to create a public key 252 that is used in the electronic signature 224. The public key 252 is extracted from the electronic signature 224 by the host computer 202 or the printer 100 to validate the electronic signature 224, a process that will be described in greater detail below.

The electronic signature authority 206 is commonly a server that stores an electronic signature database 254. The electronic signature database 254 contains a plurality of user identifiers 256, each user identifier being associated with a public key 258 created by a user associated with the user identifier 256 as described above. The electronic signature database 254 may maintain a user signature 260 for each signature identified by a user identifier 256 in the electronic signature database 254. The user signature 260 may comprise some combination of bits that uniquely identifies the signer. As used herein, however, the user signature 260 comprises a graphic depiction of the signer's actual handwritten signature. When a document containing such a signature is printed, a facsimile of the signer's signature is printed at an appropriate place on the document. The signature cannot be printed if the signature is not verified. In one implementation, the document itself may not be printed of the signature is not validated.

In typical use, a user at the remote computer 204 electronically signs the document 244 in the remote computer 204 by deriving the public key 252 and affixing the electronic signature 118 to the document 244, 116. The content of the electronic signature 118 may vary, but one or both of the detection module 120 and/or the verification module 122 should be able to determine a user's identity and the public key 252 from the electronic signature 118.

When a user of the printer 100 (or the host computer 202) wishes to print out the document 116, the detection module 120 in the printer 100 determines if the document 116 has an electronic signature 118 included in it. When the electronic signature 118 is included in the document 116, an electronic tag signifying the presence of the electronic signature 118 is placed in the document 116 in the location of the electronic signature 118. The detection module 120 is configured to search the document 116 for such a tag. If and when such a tag is located, the browser 124 is directed to contact the electronic signature authority 206 via the Internet 208. The verification module 122 is configured to match the electronic signature 118 (specifically, the user identifier and public key contained in the electronic signature 118) with the user identifier 256 and public key 258 stored in the electronic signature database 254 and associated with the user. Further details will be discussed below with reference to the flow diagram shown in FIG. 3.

Methodological Implementation: Electronic Signature Printing System

Figure 3:
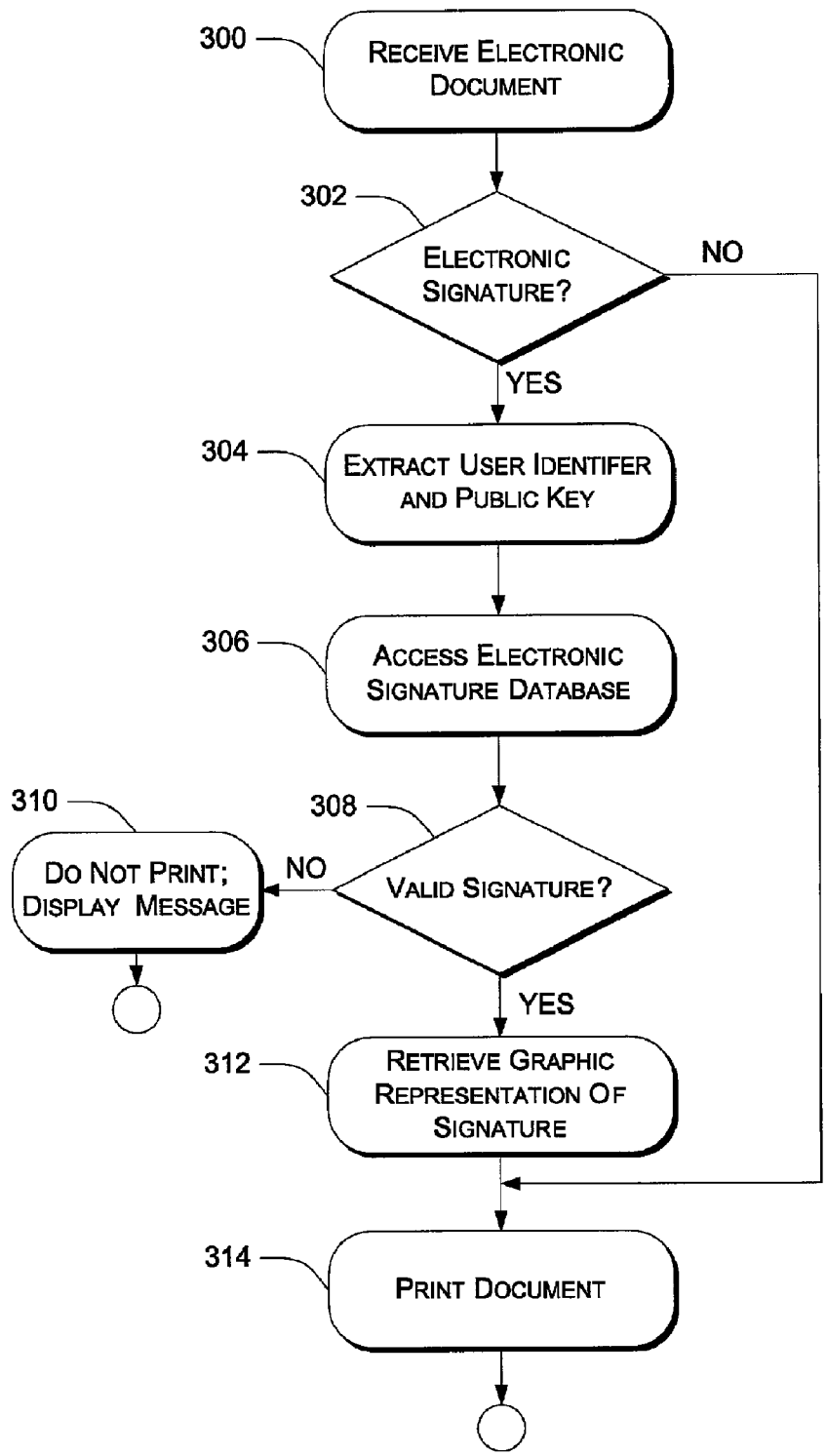
FIG. 3 is a flow diagram depicting a method for printing documents that include one or more electronic signatures.

FIG. 3 is a flow diagram depicting a methodological implementation of a printer configured to print documents that contain one or more electronic signatures. In the following discussion of FIG. 3, continuing reference will be made to the elements and reference numerals shown in FIG. 1 and FIG. 2.

At block 300, the printer 100 receives the document 116 containing the electronic signature 118. The printer 100 may receive this document from the remote computer 204 over the Internet 208 or from the host computer 202. In one implementation, the document may already be stored on the printer, as in the case where the document is a stored print job. In such a case, input from an external device such as a printer panel or a squirt from a portable electronic device is required to activate the print job.

At block 302, the detection module 120 determines if the document 116 contains the electronic signature 118. If the document 116 does not contain an electronic signature 118, then the printer 100 prints the document 116 at block 314 ("No" branch, block 302).

Since the document 116 contains the electronic signature 118 in this instance ("Yes" branch, block 302), the detection module 120 extracts the user identifier 246 and the public key 252 from the electronic signature 118 (block 304). At block 306, the verification module 122 accesses the electronic signature database 254 at the electronic signature authority 206. The verification module 122 determines if the signature is valid at block 308.

This determination may be made in several ways. In one implementation, the verification module 122 determines if the public key and the user identifier extracted from the electronic signature 118 match an associated combination of user identifier 256 and public key 258 stored in the electronic signature database 254. If not ("No" branch, block 308), then the document 116 is not printed and a message may be displayed to the user on the display 106 of the printer 100 and/or a corresponding message may be sent to the user via e-mail, etc.

If a match is found ("Yes" branch, block 308), then the graphic representation of the signature 260 is retrieved from the electronic signature database 254 (block 312) and the document 116 is printed at block 314, with the appropriate signature 260 being printed with the document 116 at the appropriate place. This is a preferred implementation. However, this step is not necessary if a printed signature is not required.

CONCLUSION

Implementation of the systems and methods described herein provide a reliable method for verifying electronic signatures before allowing a document containing an electronic signature to be printed. This way, a document having a forged or incorrect electronic signature cannot be printed and put to ill use.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for printing a document that contains an electronic signature, comprising:
    detecting the presence of the electronic signature in the document, the electronic signature including a user identifier and a public key;
    extracting the user identifier from the electronic signature associated with the document, the user identifier identifying a person who has signed the document;
    extracting the public key from the electronic signature;
    verifying whether or not the public key extracted from the electronic signature is a public key that has been created by the person who signed the document including:
        accessing a signature database that stores a plurality of user identifiers and a plurality of public keys, each public key being associated with a user identifier; and
        determining that the electronic signature is valid by verifying that the user identifier and the public key extracted from the electronic signature are associated with each other in the signalize database, and;
    printing the document if the verification determines that the public key associated with the electronic signature is a public key created by the person who signed the document and nor printing the document if the verification fails.

2. The method as recited in claim 1, wherein the detecting the presence of the electronic signature further comprises detecting an electronic tag within the document that indicates the presence of an associated electronic signature.

3. The method as recited in claim 1, wherein the extracting of the user identifier further comprises identifying the user id antler as at least a portion of the electronic signature.

4. The method as recited in claim 1, wherein extracting of the public key further comprises identifying the pubic key as at least a portion of the electronic signature.

5. The method as recited in claim 1, wherein the printing further comprises printing the electronic signature with the document.

6. The method as recited in claim 5, wherein the printing the electronic signature further comprises printing an image of a handwritten signature of the person who signed the document.

7. The method as recited in claim 1, wherein the public key further comprises a pubic key that is created by encrypting a private key with a password key, he private key and the password key being uniquely associated with the person who signed the document.

* * * * *

UNITED STATES PATENT AND TRADEMARK OFFICE
CERTIFICATE OF CORRECTION

| | | |
|---|---|---|
| PATENT NO. | : 8,041,952 B2 | Page 1 of 1 |
| APPLICATION NO. | : 09/967511 | |
| DATED | : October 18, 2011 | |
| INVENTOR(S) | : Travis J. Parry | |

It is certified that error appears in the above-identified patent and that said Letters Patent is hereby corrected as shown below:

In column 6, line 35, in Claim 1, delete "signalize" and insert -- signature --, therefor.

In column 6, line 39, in Claim 1, delete "nor" and insert -- not --, therefor.

In column 6, lines 45-46, in Claim 3, delete "id antler" and insert -- identifier --, therefor.

In column 6, line 48, in Claim 4, delete "pubic" and insert -- public --, therefor.

In column 6, line 58, in Claim 7, delete "pubic" and insert -- public --, therefor.

In column 6, line 59, in Claim 7, delete "he" and insert -- the --, therefor.

Signed and Sealed this
Nineteenth Day of June, 2012

David J. Kappos
*Director of the United States Patent and Trademark Office*